United States Patent
Takata

[15] 3,672,460
[45] June 27, 1972

[54] CONTROL MEANS FOR POWER STEERING SERVO

[72] Inventor: Harry H. Takata, Golden Valley, Minn.
[73] Assignee: Raygo, Inc., Minneapolis, Minn.
[22] Filed: Feb. 16, 1971
[21] Appl. No.: 115,642

[52] U.S. Cl..................180/79.2 B, 60/52 S, 74/388 PS, 91/381, 180/51, 280/404, 280/468, 280/492
[51] Int. Cl..................................................B62d 5/06
[58] Field of Search................180/79.2 B, 51; 280/463, 464, 280/468, 469, 492, DIG. 9; 60/52 S; 74/388 PS; 91/381

[56] References Cited

UNITED STATES PATENTS

| | | | |
|---|---|---|---|
| 2,535,927 | 12/1950 | Hyler | 180/79.2 B X |
| 2,762,585 | 9/1956 | Eaton et al. | 91/381 X |
| 2,799,250 | 7/1957 | Livers | 91/381 |
| 2,841,231 | 7/1958 | Armington | 180/79.2 B |
| 3,312,301 | 4/1967 | Hagen | 180/79.2 B |

Primary Examiner—Benjamin Hersh
Assistant Examiner—Leslie J. Paperner
Attorney—Ira Milton Jones

[57] ABSTRACT

A vehicle having a pair of units relatively swingable by a steering servo features a differential device comprising a housing that confines two bevel gears to coaxial rotation independently of it and one another and confines a bevel pinion meshing with them to rotation on an axis transverse to theirs. The servo energization control is mounted on one unit, the other unit is connected on its swinging axis with one bevel gear. The other bevel gear is connected with the movable member of the energization control. The housing is connected with a steering wheel to rotate with its turning.

5 Claims, 4 Drawing Figures

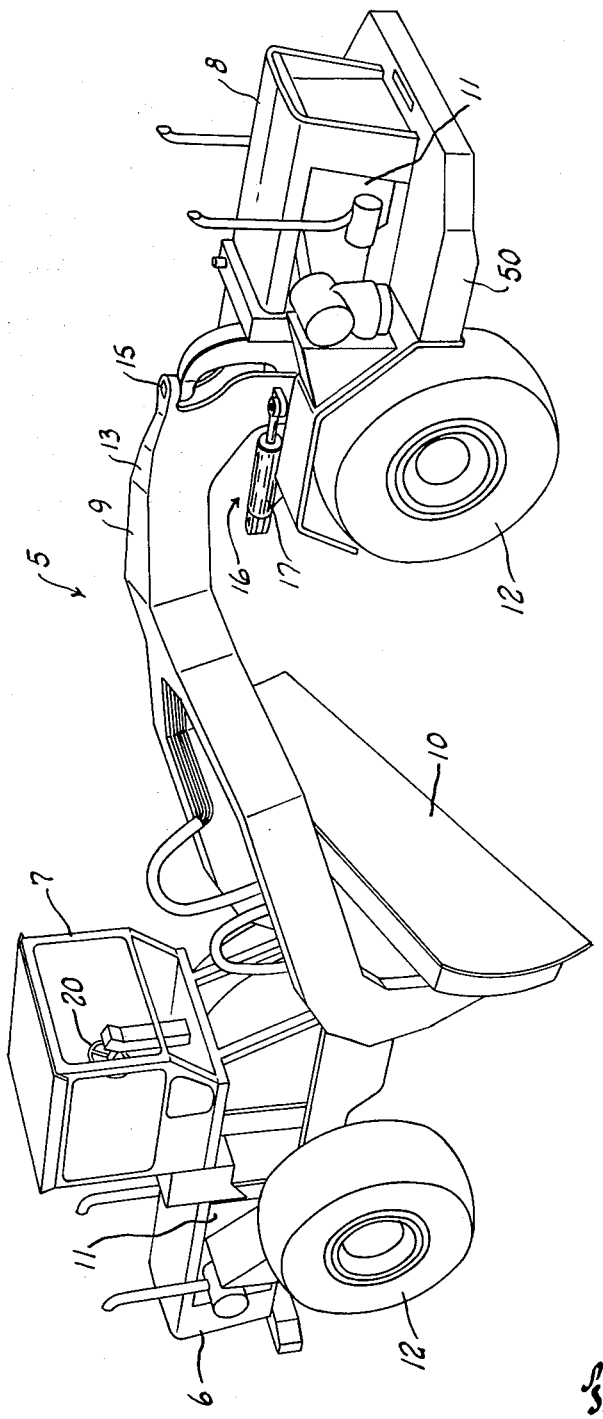

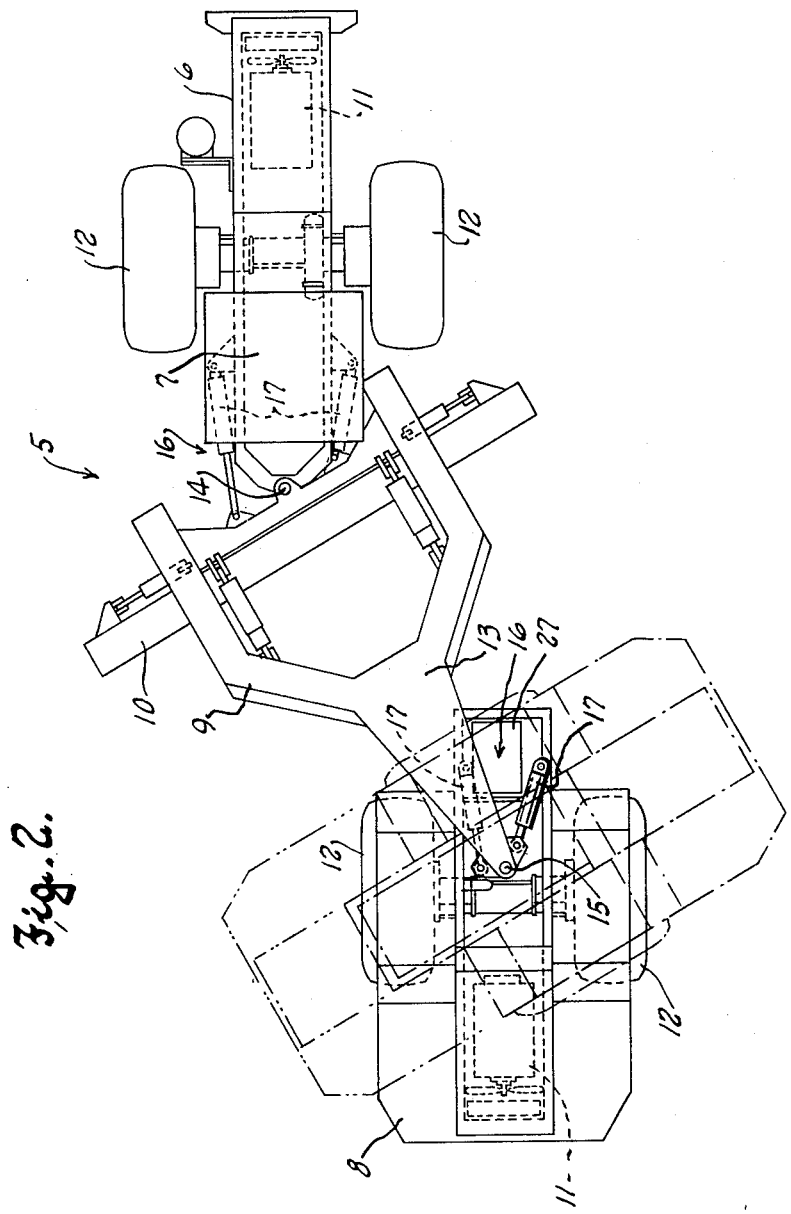

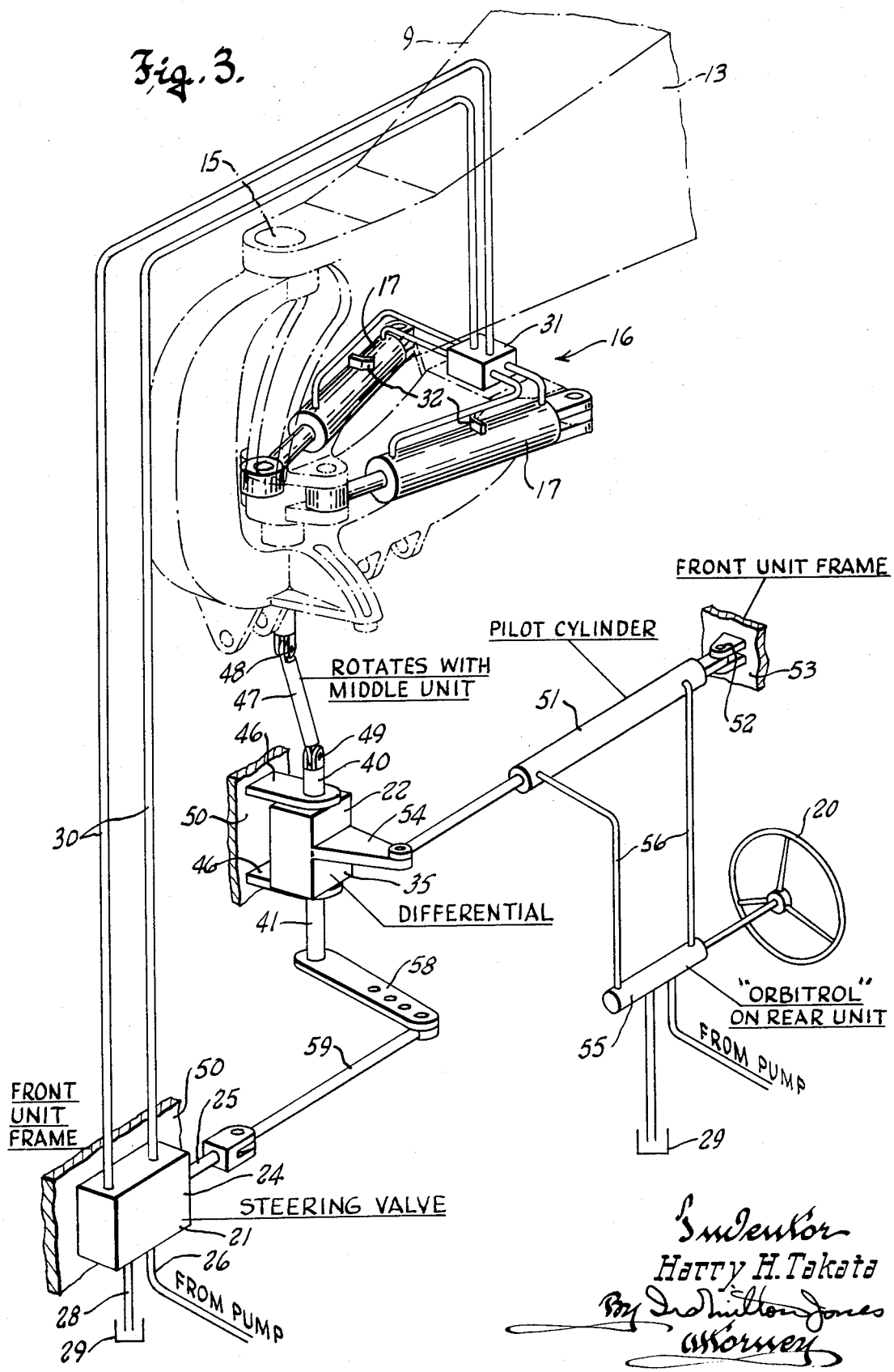

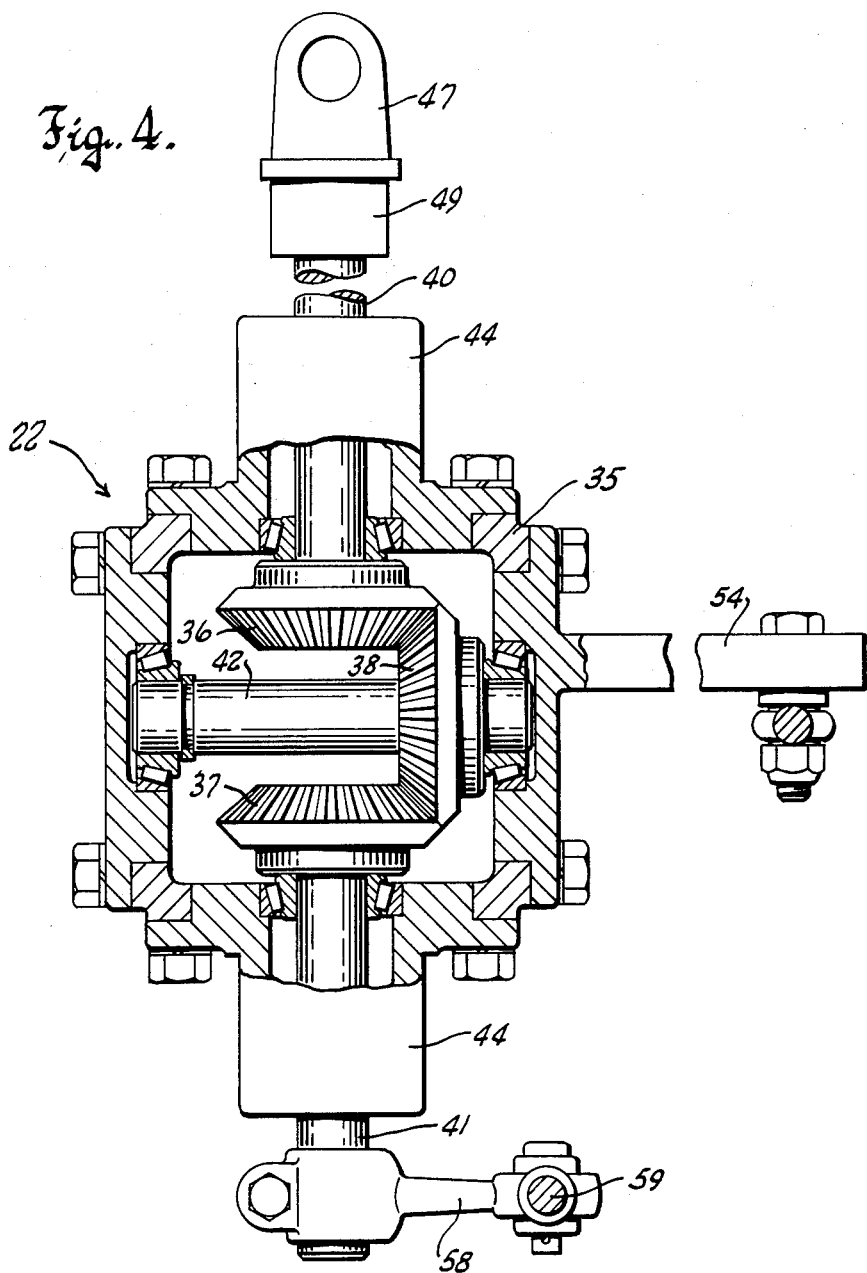

CONTROL MEANS FOR POWER STEERING SERVO

This invention relates to power steering control and servo mechanisms, and is more particularly concerned with power steering apparatus for vehicles in which the unit that is rotated or swung by the steering servo mechanism can traverse substantially large angles in each direction, and in which there must be an accurate feedback to the manually actuatable steering control member for the servo mechanism, so that the position and rate of swing of the actuated unit will correspond closely to the position and rate of movement of the manually actuatable member to give the operator good steering "feel."

An example of the type of application in which the apparatus of this invention has particular utility is an earth working machine having an articulated chassis comprising front and rear units connected for relative swinging movement about a substantially upright axis. Such machines are large and heavy, and the requirements of the work that they perform make it desirable that steering be accomplished by swinging the articulated chassis units relative to one another, rather than by the more conventional swinging of the wheels relative to the chassis.

With such machines the swinging relative motion of the articulated chassis units is commonly produced by a steering servo comprising a pair of double-acting hydraulic cylinders, each connected between the two units, with the respective cylinders disposed at opposite sides of the longitudinal centerlines of the units. With such machines the chassis units must be capable of swinging to turning positions in which their longitudinal centerlines are at as much as 90° to one another in each direction. In the course of making a full swing in one direction of steering motion, at least one of the hydraulic cylinders undergoes a reversal, that is, it initially retracts and then, partway through the swing it goes overcenter relative to the swinging link with which it is connected, and thereafter, through the remainder of the swinging motion, it extends. To effect such reversal, a flow reversing valve is connected in the hydraulic circuit for the cylinders, actuated by a cam mechanism or the like that cooperates with the reversing cylinder as the latter passes through its overcenter position.

For accurate control, a power steering system requires a feedback from the steering servo to the manually actuatable steering control, so that the operator has steering feel.

The problem to which the present invention is directed arises in substantial part from the fact that the servo of a power steering system effects relative swinging or angular movement of the steeringly actuated unit, whereas the control means for the servo may comprise a conventional spool valve mounted on one of the relatively swingable units and having a spool that is movable in a straight line in opposite directions from a neutral position. Normally, the rate of motion of the steering servo depends upon the amount by which the spool is displaced from neutral, and a small displacing motion brings about a substantially large change in the rate of steering swing produced by the servo. The conventional manually actuatable steering control member is a steering wheel, and to insure steering accuracy the angle through which it is turned should be a multiple of the angle through which the steered unit swings. For the feedback required for accurate steering control, the steering wheel, the steeringly moved unit and the linearly movable element of the servo control means must be interconnected. Not only must the means providing this interconnection accommodate the different kinds of motion of the interconnected components but it must also accommodate the very substantial differences in the magnitudes of their respective motions for a given steering action.

In a steering system such as that described above, in which the steered unit is swung through substantially large angles by a pair of double-acting hydraulic cylinders, it is obviously impractical to utilize either the hydraulic cylinders themselves or the fluid flowing to or from them as the source of feedback, owing to the motion reversal that they undergo. Hence the follow-up mechanism heretofore used with such systems has comprised a complicated arrangement of levers and drag links connected between the relatively swingable units. Because of its complexity this arrangement entailed maintenance problems, and in spite of its complexity it did not provide really good steering feel.

In the apparatus of the present invention a differential device is employed to provide the control and feedback connection just described. Differential devices have previously been proposed for this purpose in power steering systems, as in the Livers U.S. Pat. No. 2,799,250, Davis U.S. Pat. No. 2,784,703 and Eaton et al. U.S. Pat. No. 2,762,585. However, in none of these systems was the differential device connected in a manner to afford the requisite degree of accuracy, feel and sensitivity for a system in which the steerable unit must be swung through substantially large angles. Heretofore, in fact, differential devices do not seem to have been employed in servo steering systems where the steered unit had to be swung through substantially large angles.

The present invention thus has as its principle object to overcome the need for the complicated and troublesome linkage mechanism heretofore used for steering follow-up in power steering systems of the character described, wherein the steeringly swung unit must be movable through substantially large angles, and to provide a control and feedback connection for such a system whereby very rapid and accurately responsive steering control is obtained, with good steering feel for the operator.

It is also an object of this invention to provide means for connecting a manually actuatable steering control member with a servo control for a power steering system, and for further connecting these with the servo mechanism in a manner to provide an accurate and symmetrical feedback from the steered unit to the manually actuatable member.

Another and more specific object of this invention is to provide a power steering control apparatus in which steering sensitivity (i.e., feedback ratio) is easily adjusted.

With these observations and objectives in mind, the manner in which the invention achieves its purpose will be appreciated from the following description and the accompanying drawings, which exemplify the invention, it being understood that changes may be made in the specific apparatus disclosed herein without departing from the essentials of the invention set forth in the appended claims.

The accompanying drawings illustrate one complete example of an embodiment of the invention constructed according to the best mode so far devised for the practical application of the principles thereof, and in which:

FIG. 1 is a perspective view of an earth leveling machine embodying this invention;

FIG. 2 is a plan view of the machine with non-essential details omitted and illustrating in light broken lines the angle through which the front unit of the machine can be swung with respect to the middle unit to effect steering;

FIG. 3 is a diagrammatic perspective view of the steering mechanism; and

FIG. 4 is a side view of the differential device that forms part of the steering mechanisms with parts broken away and in section.

Referring now more particularly to the accompanying drawings, the numeral 5 designates generally an earth working machine which exemplifies the type of apparatus upon which an embodiment of the present invention can be beneficially installed, and which comprises, in general, a rear unit 6 that carries an operator's control cab 7, a front unit 8, and a yoke-like middle unit 9 which is articulatedly connected at its front and rear ends with the front and rear units, respectively, and which carries a ground working implement 10, shown as a scraper blade. In the particular machine here illustrated there are two engines 11, one in the front unit and one in the rear one, each driving a pair of ground engaging wheels 12 on its unit.

The yoke-like middle unit 9 is generally wishbone shaped. Its narrow end is forward and provides an upwardly curving gooseneck 13. The scraper blade 10 extends across its bifurcated rear end, at right angles to the longitudinal centerline of the unit.

The middle unit 9 has a rear pivot connection 14 with the rear unit 6 by which the rear and middle units are swingable relative to one another about a substantially upright axis that intersects their longitudinal centerlines. The middle unit has a generally similar articulated connection 15 with the front unit 8.

In each instance relative swinging motion between pivotally connected units is effected by means of a servo motor 16 comprising a pair of double acting cylinders 17, each connected between the two units to which relative swinging motion is to be imparted, the respective cylinders of each pair being connected at opposite sides of the longitudinal centerlines of the units.

Relative swinging motion between the middle and rear units is provided for in order to improve the efficiency and capacity of the machine when it is scraping to one side. As the machine moves forward, there is a so-called side draft exerting to the lateral reaction force that earth exerts against the scraper blade when the latter is inclined to its path of motion. Swinging the middle unit to the side of the machine towards which earth is to be moved not only disposes the scraper blade at the desired inclination, but offsets the front wheels to that side of the machine. For straight forward motion, the longitudinal centerline of the front unit is then oblique to that of the middle unit but parallel to that of the rear unit, and the machine moves forwardly dog-fashion, with its offset front wheels exerting a tractive force that overcomes side draft.

The wheels 12 are not steerable relative to the units on which they are mounted. Instead, steering of the machine is ordinarily effected by swinging the front unit relative to the middle one. Control of swinging motion of the front unit therefore requires particularly good accuracy and feel, and consequently the apparatus of the present invention is described in its application to the articulated connection 15 between the front and middle units. However, it will be understood that this installation merely exemplifies one embodiment of the invention, and that if desired the same apparatus could be employed at the rear articulating connection 14.

In general, the steering control system comprises a manually actuatable control member or steering wheel 20 in the operator's control cab 7, an energization control device 21 that governs the direction and rate of motion of the servo motor 16, and a differential device 22 that provides a control and feedback connection between the steering wheel, the energization control device and the servo motor.

The energization control device 21 in this case comprises a generally conventional hydraulic servo control valve of the spool type, having a body 24 that is fixed to the front unit 8 and a valve element or spool 25 that is movable linearly relative to the body 24, in opposite directions from a neutral position. As will be well understood by those acquainted with hydraulic apparatus, the servo control valve 21 has in its body a pressure fluid inlet 26 which is normally connected with a pump 27 driven by the engine 11 on the front unit, a return fluid outlet 28 which communicates with a fluid reservoir 29, and service outlets 30 which are communicated with the servo motor.

When the front wheels are in offset relation to the rear ones, the machine can make short radius turns in the direction opposite to that in which the front wheels are offset only if the front unit is capable of swinging to a position in which its longitudinal centerline is at right angles to that of the middle unit, in which position the front unit may have its longitudinal centerline at only 45° to that of the rear unit. Hence the front unit must be capable of swinging through a full 180° relative to the middle one. As explained hereinabove, producing a swinging motion of this magnitude with a pair of hydraulic cylinders requires that one of them undergo a reversal of its direction of motion in the course of a full traverse in one direction. A flow reversing valve 31 is a known means for effecting such reversal at appropriate points in the cycle of swinging motion. It is mounted on one of the two pivotally connected units (the front one in this case), close to the cylinders 17 that it controls, and it is actuated in a known manner by cams 32 or the like on those cylinders. The flow reversing valve of course comprises a part of the hydraulic connection between the service outlets 30 of the servo control valve 21 and the double-acting servo cylinders 17.

The body of the servo control valve 21 is also shown as mounted on the front unit 8, near its servo motor 16. As is conventional, the direction in which its spool or valve element 25 is moved out of its neutral position determines the direction in which the units 8 and 9 are swung with respect to one another by the steering mechanism, and the amount by which the spool is thus displaced determines the rate at which the units are swung relative to one another.

Through the differential device 22 the spool 25 of the control valve 21 is displaced from its neutral position in accordance with displacements of the steering wheel 20 and tends to be moved back to neutral by relative swinging motion between the middle and front units, so that the differential device affords a feedback from the steering servo 16 to the steering wheel.

The differential device comprises, in general, a pair of bevel gears 36 and 37, a bevel pinion 38, and a housing 35 which serves as cage means for said gears and pinion. The bevel gears 36 and 37 are respectively anchored to shafts 40 and 41 which project coaxially outwardly of the housing from those bevel gears and which are journalled in the housing for rotation independently of one another and of the housing. The bevel pinion 38 is rotatable on a stub shaft 42 that is journalled in the housing and has its axis transverse to the axis of the shafts 40 and 41. The bevel gears are spaced apart in the direction of their mutual axis, and the bevel pinion is in meshing engagement with both of them.

The housing or cage means 35 of the differential device must be rotatable not only relative to the coaxial shafts 40 and 41 but also relative to the two units 8 and 9 with which it cooperates. To this end the differential device is shown with collar-like bosses 44 on its housing, coaxially surrounding the bevel gear shafts 40 and 41, and these bosses are rotatably confined in yoke-like brackets 46 that project inwardly from a side frame member 50 of the front unit.

It is because of the particular manner in which the differential device is connected with other elements of the steering system that the apparatus of the present invention affords unusually accurate steering control and feel. In general, the steering wheel 20 is connected with the differential housing or cage means 35 in such a manner that rotation of the steering wheel effects a proportional and corresponding rotation of the cage means relative to the bevel gears; the servo control spool valve 21 has its body fixed to one of the steeringly swingable units, and one of the bevel gears is connected with the other of those units, substantially on the swinging axis thereof; and the other bevel gear is connected with the spool of the valve 21 in such a manner that rotation of the last mentioned gear relative to the first mentioned unit imparts linear motion to the valve spool.

More specifically, the servo control valve 21 has its body fixed to the front unit 8, while one bevel bear of the differential means (the upper one 36 as shown) has a connection with the yoke-like middle unit 9. The king pin 15 that provides the swingable connection between the front and middle units is anchored to the middle unit so that is is constrained to rotate therewith relative to the front unit. To provide clearance for other components of the front unit 8 that must be disposed on or near its longitudinal centerline, the differential device 22 is mounted with the axis of its shafts 40 and 41 spaced to one side of that centerline, and an effectively coaxial connection between the king pin 15 and the upper bevel gear 36 is provided by a universal joint shaft 47 that has a coaxial securement 48 to the kingpin at its upper end and a splined coaxial connection 49 to the shaft 40 at its lower end.

The steering wheel 20 is mounted on the rear unit 6, in the operator's cab 7, and hence it is impractical, in this case, to provide a direct mechanical connection between it and the cage means 35 of the differential device, which is on the front unit. (However, such a connection would be suitable in an installation where it could be accommodated). In the present case, therefore, the steering wheel has a hydraulic connection with the cage means, comprising a double-acting hydraulic pilot cylinder 51. The pilot cylinder has a pivotal connection 52 with a side frame member 53 of the front unit 8, opposite the frame member that carries the brackets 46 which rotatably support the differential housing. Its piston has a pivotal connection with a radially extending arm 54 on the differential housing 35. Hence retraction and extension of the piston of the hydraulic pilot cylinder 51 effects rotation of the differential housing in one direction or the other about the axis of the shafts 40 and 41. The pilot cylinder is in turn controlled by a known type steering valve 55 (such as that sold under the trademark Orbitrol) with which the steering wheel has a direct mechanical connection. The steering valve has hydraulic connections, through hoses 56, with the pilot cylinder 51, as well as being hydraulically connected with a suitable pump (not shown) which can be driven by the engine 11 on the rear unit.

The connection between the lower bevel gear 37 and the spool 25 of the energization control means 21 comprises a lever arm 58 which extends radially from the shaft 41 that is connected with said gear, and a link 59 which is connected between said lever arm and the valve spool. The lever arm 58 extends generally transversely to the axis of the valve spool 25, while the link 59 is generally in line with it. Hence swinging motion of the lever arm 58 imparts linear motion to the valve spool, and the ratio between their motions depends upon the effective length of the lever arm.

The operation of the apparatus will now be apparent.

When the operator turns the steering wheel 20 from any position in which it had been previously placed, the double-acting pilot cylinder 51 extends or retracts its piston. The arrangement of the steering valve 55 is such that the direction of motion produced by the pilot cylinder 51 corresponds to the direction in which the steering wheel is moved, and the pilot cylinder tends to maintain a position of extension that corresponds to the rotational position of the steering wheel; hence the rate of extension or retraction of the pilot cylinder piston tends to correspond to the rate at which the wheel is turned.

Upon initial motion of the steering wheel 20 and the pilot cylinder 51, the front and middle units 8 and 9 are stationary relative to one another, and therefore the upper bevel gear 36 does not rotate relative to the front unit 8 or the servo control valve 21 carried thereby. Hence upon initial motion of the pilot cylinder the housing or cage means 35 of the differential device 22 is rotated relative to the upper bevel gear 36. This effects a rotation of the bevel pinion 38, which in turn imparts rotation to the lower bevel gear 37. Note that with the upper bevel gear thus relatively fixed, the lower bevel gear rotates in the same direction as the differential housing 35, but turns through an angle twice as large as that through which the differential housing was rotated by the pilot cylinder 51. In effect, therefore, the motion of the pilot cylinder is imparted to the servo control valve 21 in magnified or amplified form, so that the servo control valve has a fast, sensitive, accurate response. As pointed out above, the degree of this magnification or amplification depends upon the effective length of the lever arm 58, and consequently the sensitivity of the steering system can be adjustingly changed by changing the location along the lever 58 of its connection with the link 59.

Because of the rapid response of the steering servo motor 16 to any displacement of the steering wheel, the servo motor, comprising the double acting cylinders 17, begins to effect swinging of the front unit 8 relative to the middle unit 9 almost as soon as the steering wheel is displaced. The consequent rotation of the upper bevel gear 36 with rotation of the kingpin 15 attached to the middle unit 9 is in the same direction as the rotation of the cage means 35 that occasioned it.

At any instant the position of rotation of the cage means is that which is established by the pilot cylinder 51. For the moment, therefore, the cage means 35 can be thought of as fixed while the upper bevel gear 36 rotates relative to it. Through the bevel pinion 38, the upper bevel gear, by its rotation relative to the cage means, imparts to the lower bevel gear 37 a rotation in the direction opposite to that in which the upper bevel gear is turning and at a rate relative to the cage means which is equal to that of the upper bevel gear. Such rotation of the lower bevel gear 37 relative to the cage means 35 of course tends to return the valve spool 25 to its neutral position. However, assuming that the arms 54 and 58 have equal effective lengths, the angle through which the front steerable unit 8 must swing relative to the middle unit 9 in order to return the valve spool 25 to its neutral position is twice the angle through which the cage means 35 is rotatably displaced by the pilot cylinder 51. This means that a relatively large angle of steering swing is achieved with a relatively small extension or retraction of the pilot cylinder. Specifically, the pilot cylinder need only extend or retract sufficiently to rotate the cage means through 45° in order to effect a relative steering swing of the articulatedly connected units 8 and 9 through a full 90°. Hence there is no need for the pilot cylinder 51 to go overcenter and reverse its direction of motion in the course of a full 180° steering swing in one direction.

From the foregoing description taken with the accompanying drawings it will be apparent that this invention provides a control system for a steering servo mechanism which is particularly well adapted for installations wherein the steerable units must be actuated through substantially large angles of steering swing, and which provides fast-responding and accurate steering actuations with good steering feel.

Those skilled in the art will appreciate that the invention can be embodied in forms other than as herein disclosed for purposes of illustration.

The invention is defined by the following claims:

1. In a vehicle having a chassis which comprises a pair of units articulatedly connected to swing for steering about a substantially upright axis through substantially large angles relative to one another, and which vehicle has servo means connected between the units for so swinging them, control means by which energization of the servo means is controlled and which comprises a relatively stationary element mounted on one of the units and a cooperating movable element displaceable in opposite directions from a neutral position at which no energization is applied to the power means, the direction and amount of displacement of the movable element from its neutral position determining the direction and rate of relative swinging motion imparted to the units, means providing a connection between the control means and a manually actuatable member that is movable in opposite directions, by which connection the rate of swinging of the units is caused to correspond closely to the rate of displacement of the manually movable member and the angle between the units is caused to correspond accurately to the position of the manually actuatable member, said connection means comprising:

A. a differential device comprising
1. a pair of gears,
2. a pinion, and
3. cage means journalling the gears for rotation on a common axis, relative to one another and the cage means and with the gears in axially spaced relation, and so connected with the pinion as to constrain it to rotate on an axis transverse to that of the gears and in mesh with both of them;

B. means providing a connection between one of said gears and the other unit, which connection is substantially on the first mentioned axis and constrains said one gear to rotate in unison with swinging movement of said other unit relative to said one unit;

C. means providing a connection between the manually actuatable member and the cage means whereby the cage means is constrained to rotate relative to said one unit in a direction and to an extent corresponding to the direction and extent of movement of the manually actuatable member; and D. means providing a motion transmitting connection between the other gear and the movable element of the control means whereby the direction and magnitude of displacement of said movable element are respectively dependent upon the direction and magnitude of rotation of said other gear relative to said one unit.

2. In a vehicle comprising a pair of units that are articulatedly connected with one another for relative swinging movement about an upright axis, and wherein steering is effected by servo means connected between the units to produce such swinging of them in response to movements of a manually actuatable member, means providing a control and feedback connection between the manually actuatable member and the servo means, said control and feedback connection means comprising:

A. a servo energization control device comprising
   1. a fixed element mounted on one of said units and
   2. a cooperating movable element displaceable relative to the fixed element in opposite directions from a neutral position,
   said control device being connectable between the servo means and an energizing source therefor and being so arranged that the direction and amount of displacement of the movable element from its neutral position determines the direction and rate of relative swinging of the units;

B. a differential device comprising
   1. cage means,
   2. a pair of bevel gears journalled in the cage means for coaxial, axially spaced apart rotation relative to one another and the cage means; and
   3. a bevel pinion journalled on the cage means and confined thereby to rotation on an axis transverse to that of the bevel gears and to meshing engagement with both of them, so that rotation of either of the bevel gears relative to the other causes the cage means to rotate relative to both of them;

C. means providing a connection between one of said bevel gears and the other of said units, said connection being substantially on the first mentioned axis and constraining said one bevel gear to rotate in unison with swinging of said other unit relative to the first designated unit;

D. means providing a connection between the cage means and the manually actuatable member, for producing rotation of the cage means relative to the first mentioned unit in correspondence with the direction and amount of motion imparted to the manually actuatable member; and E. means providing a connection between the other one of the bevel gears and the movable element of the energization control device, whereby rotation of said other bevel gear relative to the first mentioned unit effects a corresponding displacement of the movable element of the energization control device.

3. In a vehicle comprising a pair of units which are articulatedly connected for relative swinging motion through large angles in both directions about a substantially upright axis to provide for steering of the vehicle, and having servo means connected between the units for producing such relative swinging motion, means for controlling energization of the servo means comprising an element fixed to one of the units and an element movable linearly relative to said fixed element and cooperating with the fixed element to cause the servo means to produce swinging motion in a direction and at a rate corresponding to the direction and amount of displacement of the movable element from a defined neutral position, and a manually actuatable member, means providing an input and feedback connection between the manually actuatable member, the movable element and the other of said units, which connection is such that the direction and rate of swinging motion are always in a substantially constant relationship to the direction and rate of displacement of the manually actuatable member and the angular relationship of the units is always in substantial correspondence with the position of the manually actuatable member, the last mentioned means comprising:

A. a differential device comprising
   1. cage means,
   2. a pair of bevel gears confined by the cage means to coaxial, axially spaced apart relationship and rotatable relative to one another and the cage means, and
   3. a bevel pinion journalled on the cage means and confined thereby to rotation on an axis transverse to that of the bevel gears and to meshing engagement with both of them, so that rotation of either of said bevel gears relative to the other causes the cage means to rotate relative to both of them;

B. means providing a connection between one of said bevel gears and said other unit by which said one bevel gear is constrained to rotate in unison with swinging of said other unit relative to the first designated unit;

C. means providing a connection between the cage means and the manually actuatable member, for producing rotation of the cage means relative to the first mentioned unit in correspondence with the direction and amount of motion imparted to the manually actuatable member;

D. an arm having a coaxial connection with the other of said bevel gears whereby said arm is constrained to swing in unison with rotation of said other bevel gear; and E. a link connecting said arm with said movable element to effect displacement of said movable element in a direction and at a rate corresponding to the direction and rate of rotation of said other bevel gear relative to the first designated unit.

4. A servo control system having a differential device that provides a control and feedback connection between a manually actuatable control member, a servo connected between a pair of relatively swingable units to actuate them in swinging motion, and energization control means for the servo comprising an element movable in opposite directions from a neutral position relative to a cooperating stationary element fixed to one of said units and which movable element determines the direction and rate of relative swinging of the units by the direction and amount of its displacement from its neutral position, said differential device being of the type comprising a pair of bevel gears confined by cage means to coaxial, axially spaced apart rotation relative to one another and the cage means, and a bevel pinion meshing with the bevel gears and journalled on the cage means for rotation on an axis transverse to theirs, said servo control system being characterized by:

A. means fixed to said one unit confining the cage means to rotation relative to that unit about an axis which coincides with the axis of the bevel gears;

B. means providing a connection between one of the bevel gears and the other unit whereby said one bevel gear is constrained to rotate relative to the first mentioned unit in unison with relative swinging motion of said other unit;

C. means providing a connection between the cage means and the manually actuatable control member whereby the cage means is constrained to rotate relative to the first mentioned unit in a direction and through an angle that corresponds to the direction and magnitude of displacement of the manually actuatable control member; and D. means providing a connection between the other bevel gear and said movable element whereby rotation of said other bevel gear relative to the first mentioned unit imparts a corresponding displacement to said movable element.

5. The servo system of claim 4, wherein said movable element is confined to linear motion relative to said stationary element, further characterized by the last mentioned connection means comprising:

1. an arm extending radially from the axis of said other bevel gear and constrained to swing in unison with rotation of said other bevel gear; and
2. a link connected between said arm and said movable element.

* * * * *